(12) United States Patent
Hester et al.

(10) Patent No.: US 7,603,473 B2
(45) Date of Patent: Oct. 13, 2009

(54) BACKGROUND NETWORK BANDWIDTH SHARING BEHIND GATEWAY DEVICES

(75) Inventors: Anna Magdalena Hester, Redmond, WA (US); Barbara Harder, Kirkland, WA (US); Edward Francis Reus, Woodinville, WA (US); Kancheng Cao, Bothell, WA (US); Mahmood Ahmed Dhalla, Sammamish, WA (US); Mike Zoran, Redmond, WA (US); Narayana Mahankali, Bellevue, WA (US); Jeffrey S. Roberts, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 11/182,976

(22) Filed: Jul. 15, 2005

(65) Prior Publication Data

US 2007/0016688 A1    Jan. 18, 2007

(51) Int. Cl.
   G06F 15/16    (2006.01)
(52) U.S. Cl. .................. 709/232; 709/226; 709/238; 370/401; 370/468
(58) Field of Classification Search ......... 709/224, 709/226, 231–235, 238, 239; 370/352, 401, 370/468, 477
See application file for complete search history.

(56) References Cited

U.S. PATENT DOCUMENTS

| | | | | |
|---|---|---|---|---|
| 5,751,723 A | * | 5/1998 | Vanden Heuvel et al. | ... 370/528 |
| 6,754,221 B1 | * | 6/2004 | Whitcher et al. | ............ 370/401 |
| 7,236,483 B2 | * | 6/2007 | Yeom | .......................... 370/352 |
| 2002/0176404 A1 | | 11/2002 | Girard | ....................... 370/352 |
| 2003/0235209 A1 | * | 12/2003 | Garg et al. | ................... 370/468 |
| 2004/0098531 A1 | | 5/2004 | Hagg et al. | .................. 710/315 |
| 2005/0086364 A1 | | 4/2005 | Muti et al. | |
| 2005/0102529 A1 | | 5/2005 | Buddhikot et al. | ........... 713/200 |
| 2005/0278456 A1 | * | 12/2005 | Hassan | ....................... 709/235 |
| 2006/0002320 A1 | * | 1/2006 | Costa-Requena et al. | ... 370/312 |

\* cited by examiner

Primary Examiner—William C Vaughn, Jr.
Assistant Examiner—Farrukh Hussain
(74) Attorney, Agent, or Firm—Workman Nydegger

(57) ABSTRACT

Example embodiments allow a local network client to access information about a shared gateway to determine its actual amount of bandwidth consumption. The client can also obtain the total capacity of such shared gateway. Using its knowledge of its own bandwidth consumption, it can determine the other local network clients' usage of the shared gateway. With all of this information, i.e., total capacity of the shared gateway, the actual usage of the shared gateway, and the usage by other clients within the local network, the client can adjust or throttle background file transfers in order to keep the actual data transfers across the shared gateway within a reasonable percentage of the total capacity available. That is, a client will give priority to other local network computing machines' usage of the shared gateway by adjusting data transfers for its own background transfer system based on usage across a shared gateway.

17 Claims, 4 Drawing Sheets

BACKGROUND NETWORK BANDWIDTH SHARING BEHIND GATEWAY DEVICES

CROSS-REFERENCE TO RELATED APPLICATIONS

N/A

BACKGROUND

Computerized systems provide many advantageous towards peoples' ability to perform tasks. Indeed, the computer system's ability to process information has transformed the way we live and work. Computer systems now commonly perform a host of tasks (e.g., word processing, scheduling, database management, etc.) that prior to the advent of computer systems were performed manually. More recently, computing systems have been coupled together to form computer networks over which the computer systems can communicate electronically to share data. As a result, many tasks performed at a computer system (e.g., accessing electronic mail, web browsing, downloading multimedia content, etc.) include electronic communication with one or more other systems via a computer network (e.g., the Internet).

Often, electronic communication on a computer network includes a client computer system (herein referred to as a "client" or "computing device") requesting access to a service (e.g., electronic mail, web service accounts, update accounts, etc.) at a server computing system (herein referred to as "server" or "service"). For example, nowadays there are millions of personal computers (PCs) connected to the Internet for communication with various servers. Many of these clients acquire new or updated software by requesting such downloads from a remote server over the Internet.

Conventional methods of downloading/uploading data such as new and updated software to a PC over a remote network (e.g., Internet) interfere with the PCs user's ability to access content over the remote network (e.g., browsing the Internet). With increased processing speeds, it is the bandwidth to the remote network which is a significant bottleneck to the user's browsing or data retrieval experience. For example, typical download/upload transfers will saturate the slowest point in the network between the client system and server. If the slow network node is an internet gateway device (IGD) then all other traffic, both from this machine and any others sharing the IGD, are impacted by severely limiting their network utilization. Moreover, if the download/upload is interrupted for some reason (e.g., the remote network connection is lost), it may be necessary to restart the transfer from the beginning of the file, thus wasting significant network resources. Although other conventional downloading/uploading software permits the user to schedule the transmissions for a designated time, such scheduling will still limit the user's ability to engage in other network activity for those time periods.

Even though the transferring of data such as software limits a user's ability to access other data on the remote network, such download/uploading of software and other content is crucial in today's ever growing popularity of computer systems. For example, providing software updates is beneficial to PC users because it corrects problems and improves the performance of their PCs. Additionally, the software vendor benefits from a reduction in the number of product support calls, which in turn reduces the substantial resources the vendor might otherwise allocate to handle such calls.

Due to the high demand for downloading/uploading of data over remote network links, attempts have been made to mitigate interference with other remote network activity when transferring data such as software updates. For example, recently systems have been configured to determine when a relatively low level of remote network bandwidth is utilized, sometimes referred to as "remote network idle periods." Such systems monitor a level of estimated bandwidth consumption by using local network interfaces (e.g., network cards) to calculate a threshold level of utilization. Below this calculated threshold, the transfer of data between the client and server is not likely to interfere with other remote network activity. Accordingly, when a level of usage drops below such threshold value, a client may periodically connect to a server and download small portions of software or updates. This process may be continued until all portions of a software program, available updates, or other data are transferred to the appropriate device. In other words, the downloading/uploading of lower priority data may be transferred over the remote network link in a "background" process during remote network idle periods.

Although such background data transfer systems have made some significant advancement to eliminate interference with other network activity, there are still several shortcomings to these models. For example, as previously mentioned, the throttling techniques implemented by background transfer systems utilize network traffic measurements obtained from the local network interface (e.g., network card) to control and estimate the effective available bandwidth. While this approach is reasonable for many network topologies, for some configurations the information that can be retrieved by using this technique is not sufficient to allow background transfer systems to throttle accurately.

An example of such problematic network topologies is the typical home network, where computers on the local network are interconnected using a reasonably fast network link (e.g., a 100 Mbps network hubs and cards), but the device providing the Internet connectivity (e.g., Digital Subscriber Line (DSL) modems) runs at a much slower speed. In such case, the DSL box executes the role of a "gateway device" and it is in fact the segment of the network that imposes a cap for the maximum speed that can be reached by data transfers between the local network and an external or remote network (e.g., the Internet). Accordingly, when measurements for the network traffic are made at the local network interface level, the "bottleneck" represented by the reduced speed of the gateway device cannot be detected. Furthermore, the aggregate bandwidth consumption at the gateway device by systems connected to the local network cannot be measured from each system's network interfaces in isolation.

SUMMARY

The above-identified deficiencies and drawbacks of background transfer services are overcome through exemplary embodiments of the present invention. Please note that the summary is provided to introduce a selection of concepts in a simplified form that are further described below in the detailed description. The summary, however, is not intended to identify key or essential features of the claimed subject matter, nor is it intended to be used as an aid in determining the scope of the claimed subject matter.

In one embodiment, methods, systems, and computer program products are provided for controlling and estimating the effective available bandwidth for transferring background files over a shared gateway between local and remote networks by giving priority to other local network computing machines' usage of the shared gateway. In this embodiment, the total bandwidth capacity for data transferred over a shared gateway is determined. The shared gateway links a plurality of local network clients to one or more computing systems in a remote network, wherein at least one of the plurality of local network clients includes a background data transfer module configured to transfer data files at intervals when actual bandwidth consumption over the shared gateway is below a predetermined threshold. Further, statistics information on the actual bandwidth consumption for the data transfers over the shared gateway is received. Moreover, an amount of background data transfer bandwidth consumption is determined for data transfers corresponding to the at least one local network client that includes the background data transfer module. Thereafter, the total bandwidth capacity and the actual bandwidth consumption for the data transfers over the shared gateway device are compared. Based upon the comparison, the amount of background data transfer bandwidth consumption is throttled in order to reduce interfering with other activity across the shared gateway for the plurality of local network clients.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
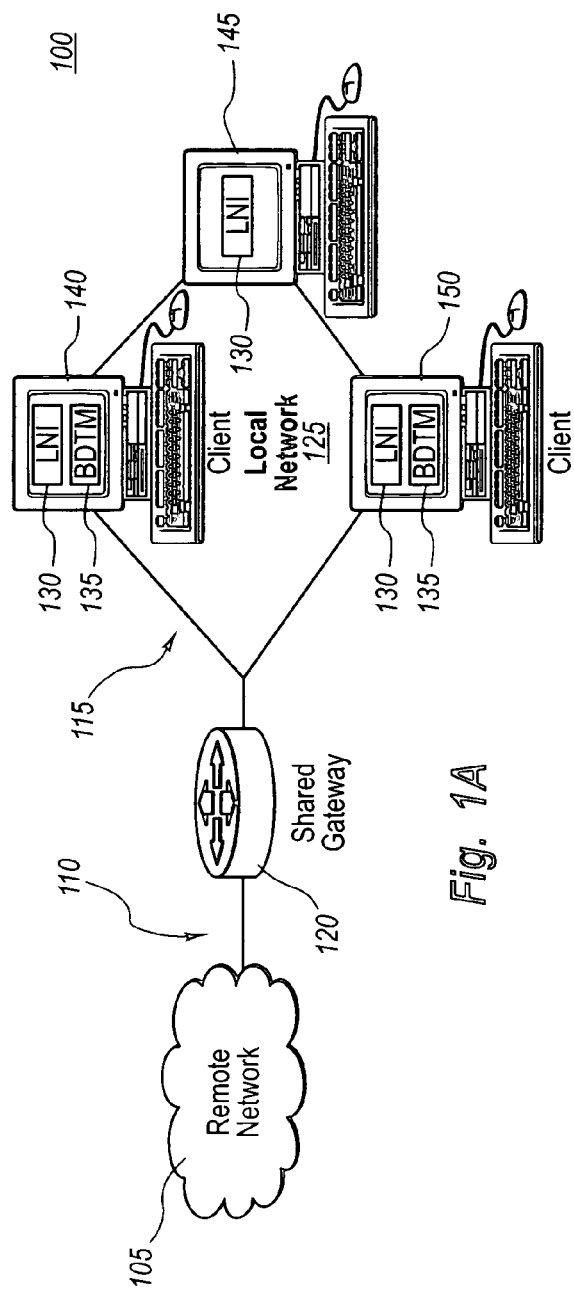
FIG. 1A illustrates a local network configuration that utilizes a background data transfer module in accordance with example embodiments.

The present invention extends to methods, systems, and computer program products for estimating the effective available bandwidth for transferring background files or data over a shared gateway device. The embodiments of the present invention may comprise a special purpose or general-purpose computer including various computer hardware or modules, as discussed in greater detail below.

As previously mentioned, determining capacity and measuring bandwidth at a transferring or receiving system's local network interface (e.g., a network card) is a local solution and misrepresents the actual available bandwidth in shared local network environments. For example, if the system has a large capacity interface card, such as a 10-100 Mbps and a limited link to the Internet over a 56 k modem, the rate of transfer will derive available bandwidth capacity from the network interface card as opposed to the actual 56k modem. When multiple systems are sharing a point of connection, one systems local network interface card capacity and derived available bandwidth does not account for other system's cumulative traffic sent or received via shared point of connection. Such inaccurate throttling rates result in bottlenecks and can saturate the remote network or Internet connection point.

In accordance with one exemplary embodiment, one solution to the above-identified deficiencies of background file transfers models is to allow each local network client to share information about its instantaneous bandwidth consumption for data transfers going outside the local network. This information may include both background data transfer information as well foreground bandwidth consumption. With the knowledge of the total capacity of a gateway device that is shared among the clients within the local network, each local network client can determine the actual bandwidth consumption over the gateway, compare it with the capacity of the shared gateway, and based on a threshold value (as discussed in greater detail below) can appropriately adjust or throttle its background data transfer rate.

Although the above exemplary embodiment provides one model for overcoming the deficiencies of current background transfer service models, this solution also has some deficiencies and drawbacks. For example, each client within the local network must be configured or have the ability to share its information with the other local network computing devices. If even just one computing device does not have such capabilities, accurately representing the network traffic across the shared gateway is nearly impossible. In addition, the sharing of information about each computing devices' bandwidth consumption puts additional load on the local network since the bandwidth consumption information must be shared amongst each computer within the local network.

Due to the above drawbacks, other exemplary embodiments provide for a solution to increase the background transfer services throttling accuracy by moving bandwidth measurements out to the shared gateway device between the local link and the connection to the remote network (e.g., the Internet). Such shared gateway devices can include devices such as a computer running Internet connection sharing software, Network Addressing Translation (NAT) boxes, or more sophisticated gateway devices sharing a modem, DSL line, Cable modem, T1 line, etc. For multiple systems sharing one connection point through byte-counter supported gateway devices, background transfer services can factor the cumulative systems inbound and outbound traffic, when calculating how much available bandwidth can be used for background transfer services or background file transfers.

In other words, a local network client can access information from a shared gateway to determine an actual amount of bandwidth consumption across the shared gateway. The client also can obtain through various means as described in greater detail below, the total capacity of such shared gateway. Using its knowledge of its own bandwidth consumption for data transfers in and out of the shared gateway, it can determine the other clients' usage of the shared gateway. With all of this information, i.e., total capacity of the shared gateway, the actual usage of the shared gateway, and the usage by other clients or computing devises within the local network, the client can adjust or throttle its background file transfers in order to keep the actual data transfers across the shared gateway within a reasonable or desired percentage of the total capacity available. That is, a client will give priority to other local network computing machines' usage of the shared gateway by adjusting data transfers for its own background transfer system.

Prior to describing further details for various embodiments of the present invention, a suitable computing architecture that may be used to implement the principles of the present invention will be described with respect to FIG. 3. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 3:
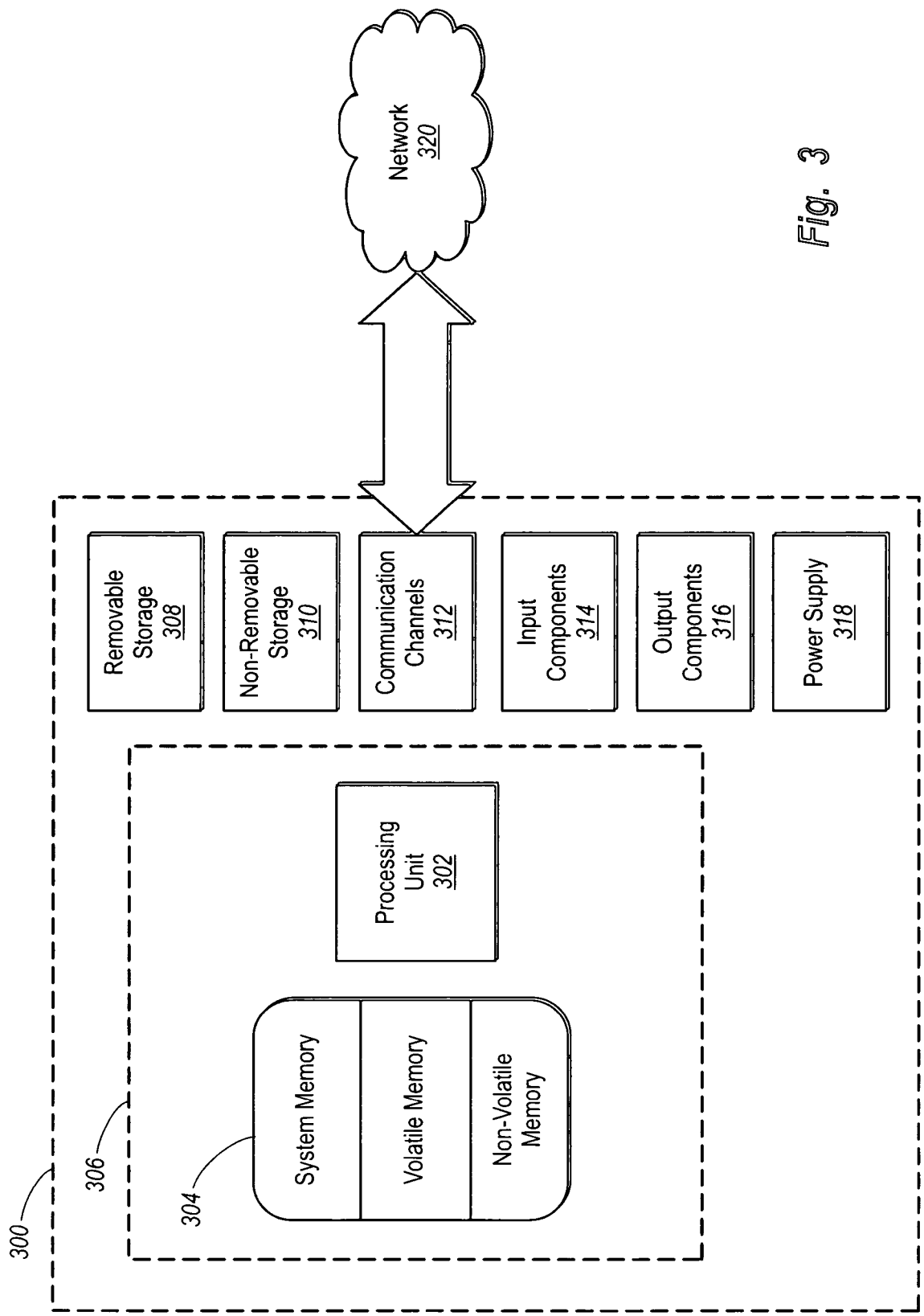
FIG. 3 illustrates an example computing system that provides a suitable operating environment for implementing various features of the present invention.

FIG. 3 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 3.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 300 typically includes at least one processing unit 302 and memory 304. The memory 304 may be volatile (such as RAM), non-volatile (such as ROM, flash memory, etc.), or some combination of the two. This most basic configuration is illustrated in FIG. 3 by the dashed line 306. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 3 by removable storage 308 and non-removable storage 310. Computer-storage media include volatile and non-volatile, removable and non-removable media implemented in any method or technology for storage of information such as computer-readable instructions, data structures, program modules, or other data. Memory 304, removable storage 308, and non-removable storage 310 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modulates running on a computing system.

Computing system 300 may also contain communication channels 312 that allow the host to communicate with other systems and devices over, for example, network 320. Communication channels 312 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 300 may also have input components 314 such as a keyboard, mouse, pen, a voice-input component, a touch-input device, and so forth. Output components 316 include screen displays, speakers, printer, etc., and rendering modules (often called "adapters") for driving them. The computing system 300 has a power supply 318. All these components are well known in the art and need not be discussed at length here.

Figure 1B:
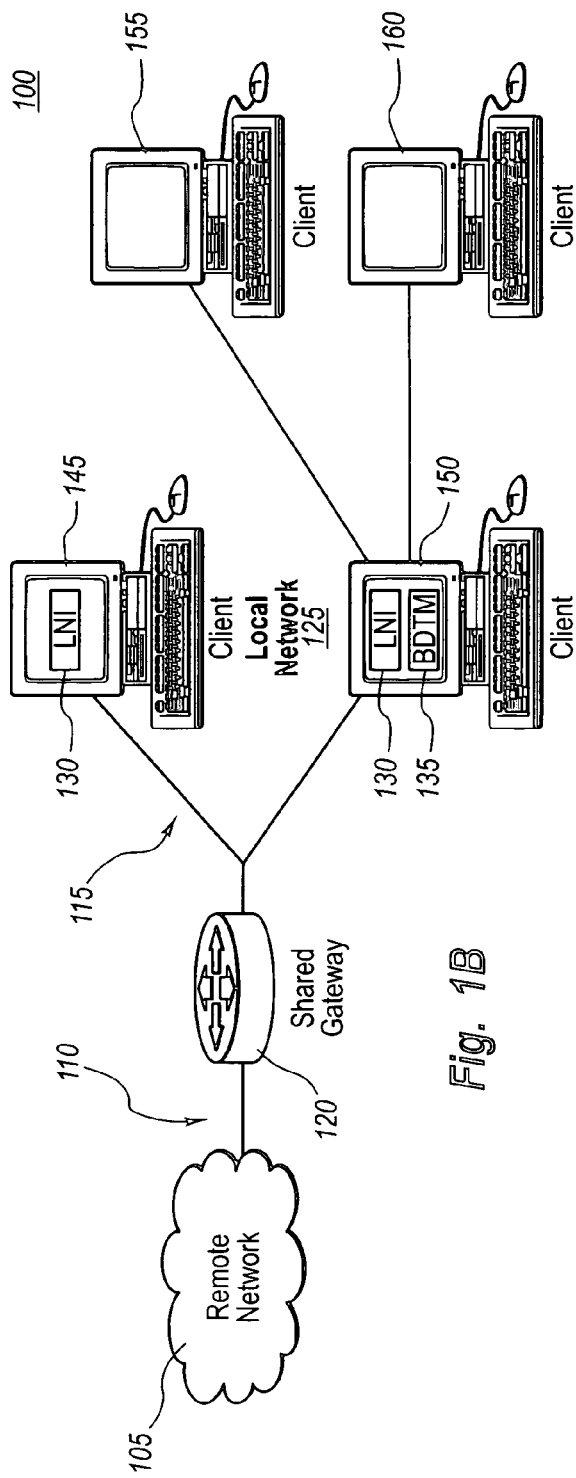
FIG. 1B illustrates a alternative topology for a local network system that utilizes a background data transfer module in accordance with example embodiments.

FIGS. 1A and 1B illustrate various topologies for distributed systems 100 that utilize background data transfer modules 135 in accordance with exemplary embodiments. The distributed system 100 may be similar to the computing system 300 described above with respect to FIG. 3, although that need not be the case. As shown in FIG. 1A distributed system 100 includes both the local network 125 and a remote network 105 connected through a shared gateway 120. Note that although the local network 125 is shown in a ring configuration (wherein each client 140, 145, 150 is connected 115 in a ring like fashion), other topologies are also available to the present invention. For example, in FIG. 1B, local network 125 clients 145, 150, 155, 160 are serially connected 115 to form a tree like structure. Of course, however, the present invention is not limited to just these topologies, but the local network 125 and the clients 140, 145, 150, 155, 160 therein may be arranged in any well known manner. Accordingly, any particular topology or configuration of the clients 140, 145, 150, 155, 160 within a local network 125 are used herein for illustrative purposes only and are not meant to limit or otherwise narrow the scope of the present invention.

Regardless of the topology or configuration of the local network 125, data or traffic flowing in and out of the local network 125 to remote network 105 will traverse across one or more shared gateways 120. The shared gateway will typically have a differing transfer rate for the connection 110 to the remote network 105 and the data flow speed for the connections 115 within the local network 125. Note that the remote network 105 may be any type of network that is outside the local network 125. For example, remote network 105 maybe a Wide Area Network (WAN), Local Area Network (LAN), the Internet, Virtual Private Network (VPN), etc. Although software and software updates that run in the background, as previously described, typically occur across the Internet, the present invention is not limited to any particular type of application download or data transfer; and therefore is not limited to any particular type of remote network 105. Accordingly, the use of any particular type of remote network 105 or data type for background data transmissions between the local network 125 and a remote network 105 are used herein for illustrative purposes only and are not meant to limit or otherwise narrow the scope of the present invention unless explicitly claimed.

Regardless of the type of data transferred across shared gateway 120 or the type of remote network 105, exemplary embodiments provide for giving priority to other local network 125 computing machines (e.g., 145, 150) usage of the shared gateway 120 in order to control and estimate the effective available bandwidth for transferring background files or data over shared gateway 120. Referring again to FIG. 1A, one or more of the local network 125 machines 140, 145, 150 may include Local Network Interfaces (LNI) 130 and/or Background Data Transfer Modules 135 (BDTMs). As will be described in greater detail below, either one of the local network interfaces 130, or the background data transfer modules 135 may be used in determining bandwidth available for transferring background data files over the shared gateway 120.

As previously mentioned, in one example embodiment, each individual client 140, 145, 150 within the local network 125 can share amongst themselves (or through a central service not shown) their usage of bandwidth over shared gateway 120. Further, the shared data may be divided into foreground and background bandwidth consumption across the shared gateway 120. Knowing the total capacity of the shared gateway 120, background data transfer modules 135 can be used to throttle background data transfers across the shared gateway 120 to assist in reducing interfering with other remote network 105 activities being executed within the local network. In other words, based on the total capacity of the shared gateway 120 and the foreground/background usage of each client 140, 145, 150, the background usage can be throttled to keep such usage below a certain threshold value (e.g., 5% of the actual total bandwidth, i.e., the total foreground/background usage) determined not to interfere with other remote network 105 activities.

Note that the total capacity for the shared gateway 120 may be determined in any number of well known ways. For example, a rated value for the shared gateway 120 capacity may be used to estimate its total capacity. Typically, however, such rated values are inaccurate. Accordingly, the total capacity may be estimated across shared gateway 120 by continuously monitoring the maximum amount of traffic across the shared gateway 120. Every time a new maximum is measured, such value may be used as an estimate of the total capacity of the shared gateway 120. Of course, other ways of determining the total capacity of the shared gateway 120 are also available to the present invention. Accordingly, any particular method for determining the total capacity of the shared gateway 120 is used herein for illustrative purposes only and is not meant to limit or otherwise narrow the scope of the present invention unless explicitly claimed.

Figure 1C:
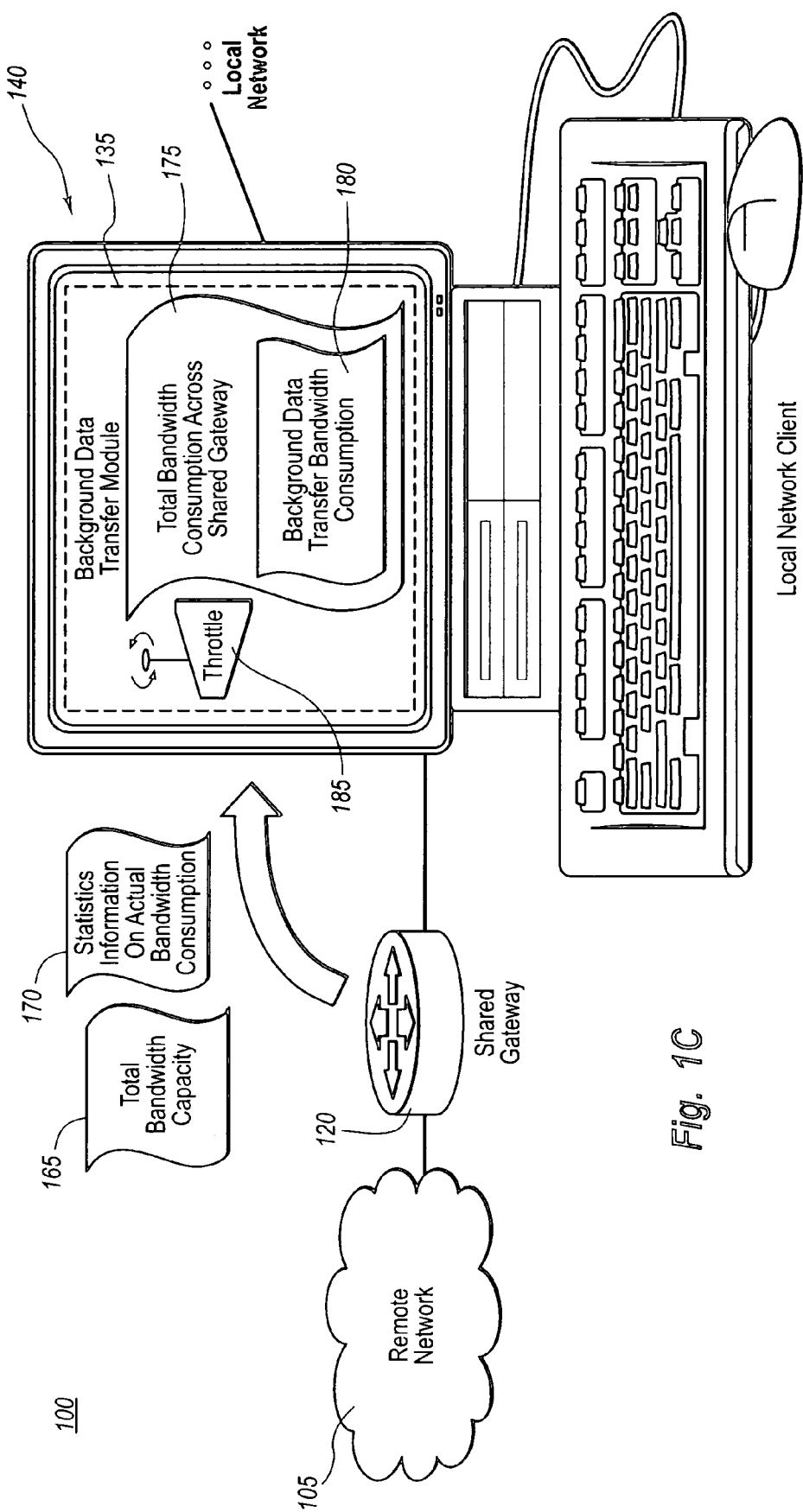
FIG. 1C illustrates a more detailed description of how a background data transfer module can be utilized in accordance with example embodiments.

In accordance with other example embodiments, rather then sharing information about the bandwidth consumption for the various local network 125 clients 140, 145, 150, embodiments provide for giving priority to other local network computing machines' usage of shared gateway 120. With reference to FIG. 1C, this embodiment also determines the total bandwidth capacity 165 for shared gateway 120 in a similar manner as that previously described above. Further, as previously noted, the client 140 can use the data background transfer module 135 to determine its own total bandwidth consumption across the shared gateway 120, which will include background data transfer bandwidth consumption 180.

Unlike the process above, however, addition statistic information on actual bandwidth consumption 170 for the shared gateway 120 at any particular point in time may also be generated and transferred to the client 140. This information represents an estimation of the total traffic (both in and out) of shared gateway 120. As discussed in greater detail below, this information may be obtained through the use of detection modules such as Universal Plug 'n Play (UPnP).

Using all of this information (i.e., total bandwidth capacity 165, statistic information on actual bandwidth consumption 170, total bandwidth consumption 175 for the client, and background data transfer bandwidth consumption 180), background data transfer module 135 can throttle 185 background data transfer across the shared gateway 120. Note that the throttling 185 may be an increase or decrease of background data transfer depending upon the results of the comparison of the aforementioned data. Accordingly, the term "throttling" should be broadly construed to include both increasing and decreasing the rate of transfer for background files, unless otherwise explicitly claimed.

In one embodiment, the background data transfer module 135 subtracts its own bandwidth consumption 175 from the actual bandwidth consumption 170 to determine the activity of the other clients (e.g., 145, 150) within the local network 125. Based on the total bandwidth capacity 165 and the usage by other clients 145, 150, background data transfer module 135 gives deference to the other clients 145, 150 in order to ensure that the other activity (i.e., the activity of the other clients 145, 150) remains at a certain percentage of the total bandwidth capacity 165. The background data transfer module 135 can adjust its network utilization 185 to only use the leftover bandwidth, i.e., the current network utilization subtracted from its estimated of the maximum network capacity across the shared gateway 120. Thus, client 140 gives priority to other local network 125 computing machine's usage of the shared gateway 120.

Note that although background data transfer module 135 used information about the other client 145, 150 activity across the shared gateway 120 to throttle 185 background data transfer, other comparisons and threshold determining values are also available to the present invention. For example, background data transfer module 135 may throttle 185 background data transfer across the shared gateway 120 based upon a percentage of usage relative to the total bandwidth capacity and the actual bandwidth consumption 170. For instance, background data transfer module 135 can throttle 185 the background data transfer to keep the percentage of usage or bandwidth consumption at a constant or near constant rate. Of course, other usages of the data from the shared gateway 120 and comparison of such information to the usage 175 by a particular client 140 are also available to the present invention. Accordingly, any particular comparison for information from shared gateway 120 and bandwidth consumption 175 from a client 140 to determine or throttle 185 background data transfer is used herein for illustrative purposes only and is not meant to limit or otherwise narrow the scope of the present invention unless explicitly claimed.

Regardless of the threshold values and information used to throttle 185 background data transfer, other exemplary embodiments provide that the available bandwidth may be calculated from either the local network interface 130 or the shared gateway 120 based on whichever has the highest consumed bandwidth or lowest available bandwidth total sent and received byte count value. For example, if the shared gateway 120 has less consumed bandwidth, and more available bandwidth within the transferring systems local network interface 130 card measurement, background data transfer module 135 may throttle 185 transfer rates to only consume the lowest available bandwidth amount, in this case, the local network interface 130 card. Accordingly, the background data transfer module 135 should check and adjust transfer rates based on the highest consumed bandwidth value or the smallest available bandwidth value, at a periodic rate (e.g., once per second).

Alternatively, or in conjunction, example embodiments can also use both the client sharing embodiment described above and the info 165, 170 for the shared gateway 120 to calculate and control available bandwidth for background data along with the local network interface. Note that when used together, the shared process and utilization of information 165, 170 from shared gateway 120 can be compared to determine a potentially more accurate representation of the actual data transfer across shared gateway 120 and usage by local network clients 140, 145, 150.

As previously mentioned, example embodiments provide that the background transfer system may utilize Universal Plug 'n Play (UPnP) to detect and query shared gateway 120 statistic counters. Pooling for statistic counter values (e.g., statistics information on actual bandwidth consumption 170 or total bandwidth capacity 165) and shared gateways 120s presence may occur on a periodic bases, e.g., once every second. Accordingly, the background transfer system should be aware anytime a gateway device is added to, or removed from local network 125. The algorithm used for throttling 185 should then be updated upon the receipt from the UPnP notification of any shared gateway 120 (or potentially other devices) addition or departure.

Note that the exemplary embodiments are also available for multiple shared gateway 120 devices within local network 125. In such instance, the background transfer system should apply file background transfer rates aligned to the same shared gateway 120 for which available bandwidth was calculated and through which the background transfer will travel. Other exemplary embodiments provide that in the event of multiple shared gateways 120 behind one or more shared connection points available to transferring systems, background data transfer modules 135s should honor a given weight and performance of one shared gateway 120 over another as assigned by the system. Accordingly, background data transfer module 135 may query for and throttle 185 background transfer rates to the device with the appropriate weight and preference as determined by the system.

Other exemplary embodiments provide that the background data transfer module 135 will recognize when it is using a different connection 110 and connection device than that of shared gateway 120 and related remote network 105 and calculate a throttling 185 accordingly. For example, in the case where a system is logged onto the remote network 105 via a cellular adaptor and cellular network the background data transfer module 135 may automatically throttle 185 to the system local network interface 130 (e.g., network interfacing cards) and estimate bandwidth size (e.g., estimated by tracking bytes sent/received over time/estimated time to server vs. actual time) in absence of the shared gateway 120.

Mobile users should be able to move to new locations in there environment and assume that background data transfer module 135 can immediately and automatically adjust its background file transfer rate based on the available bandwidth of different shared gateways 120 or other transfer devices. For example, when a laptop is moved into a new location, UPnP may be used to actively search for shared gateways 120 and expose new shared gateways 120 to background data transfer module 135 when querying for available bandwidth. Further, if the laptop is moved to a network environment without a shared gateway 120, it can detect this and immediately fall back to local network statistics without background data transfer interruption. In addition, when a new shared gateway 120 is added to a local network 125 the background data transfer module 135 should be notified as soon as UPnP discovers the new and/or replacement device.

In accordance with another example embodiment, background data transfer module 135 can be used to determine when the total bytes sent or total bytes received across the shared gateway 120 have not changed in a predetermined period of time. In such instance, background data transfer module 135 may consider the counters "stuck" and can rate transfers based on only the local network interface card 130 values, or when available may use the shared information from among the local network 125 clients 140, 145, 150.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIG. 2—is used to indicate the desired specific use of such terms.

Figure 2:
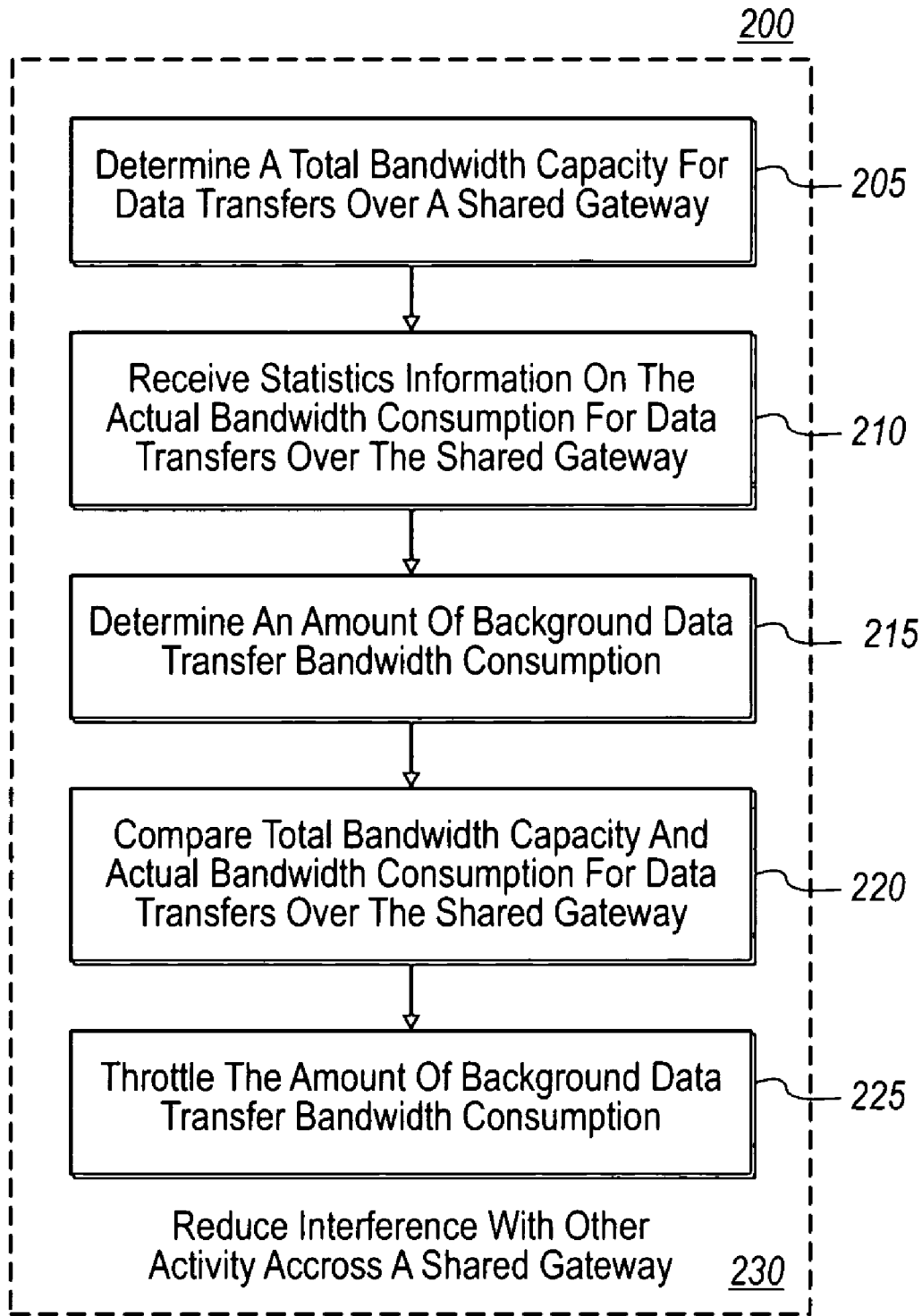
FIG. 2 illustrates a flow diagram of a method of controlling and estimating the effective available bandwidth for transferring background files over a shared gateway in accordance with example embodiments.

FIG. 2 illustrates a flow diagram for various exemplary embodiments of the present invention. The following description of FIG. 2 will occasionally refer to corresponding elements from FIGS. 1A-C. Although reference may be made to a specific element from these figures, such elements are used for illustrative purposes only and are not meant to limit or otherwise narrow the scope of the present invention unless explicitly claimed.

More specifically, FIG. 2 illustrates a flow diagram for a method 200 of controlling and estimating the effective available bandwidth for transferring background files over a shared gateway between the local network and a remote network by giving priority to other local network computing machines' usage of the shared gateway. Method 200 includes a step for reducing 230 interference with other activity across the shared gateway. Step for 230 includes an act of determining 205 a total bandwidth capacity for data transfers over a shared gateway. For example, the total bandwidth capacity 165 for shared gateway 120 may be determined based on a rate value assigned to the gateway 120. Alternatively, the total bandwidth capacity 165 may be determined through a statistic monitoring of the maximum bandwidth utilized across the shared gateway 120.

Note that the shared gateway 120 links a plurality of local network 125 clients 140, 145, 150, 155, 160 to one or more computing systems in a remote network 105. The remote network may be the Internet, a Wide Area Network (WAN), a Virtual Private Network (VPN), an Intranet subdivided into subnets connected via an Internet Gateway Device (IGD). Further, at least one of the plurality of local network clients, e.g., client 140, will include a background data transfer module 135 configured to transfer data files at intervals when actual bandwidth consumption over the shared gateway 120 is below a predetermined threshold.

Step for 230 also includes an act of receiving 210 statistics information on the actual bandwidth consumption for data transfers over the shared gateway. For example, client 140 may receive statistic information on the actual bandwidth consumption 170 for data transfers over shared gateway 120. Note that UPnP may be used to obtain the statistics information on actual bandwidth consumption 170 for data transfers on the shared gateway device. In addition, UPnP may be used to determine the total bandwidth capacity 165 by retrieving data about the maximum transfer rate across shared gateway 120.

Step for 230 further includes an act of determining 215 an amount of background data transfer bandwidth consumption. For example, background data transfer module 135 within client 140 may determine its own background data transfer bandwidth consumption 180 for data transfers across the shared gateway.

Thereafter, step for 230 includes an act of comparing 220 the total bandwidth capacity and actual bandwidth consumption for data transfers over the shared gateway. Based on the comparison, step for 230 includes an act of throttling 225 the amount of background data transfer bandwidth consumption. For example, background data transfer module 135 can compare total bandwidth capacity 165 and the statistic information on actual bandwidth consumption 170 in order to throttle 185 the background data transfer rate across the shared gateway 120. The throttling may be either an increase or decrease in bandwidth consumption over the shared gateway 120 based on the results of the comparison.

Note, as previously mentioned, the total bandwidth capacity 165 and statistics information on actual bandwidth consumption 170 can be used in various ways to throttle 185 the background data transfer rate for the computing device 140. For example, the background data transfer bandwidth consumption 180 may be a certain percentage of the actual bandwidth consumption 170 compared to the total bandwidth capacity 165. As such, the total bandwidth consumption 180 across the shared gateway device 120 for client 140 can be compared with the total bandwidth capacity 165 and the actual bandwidth consumption 170 in order to determine bandwidth consumption over the shared gateway 120 for other local network clients 145, 150.

In such instance, the throttling 185 for the background data transfer rate over the shared gateway device 120 may further be based on the bandwidth consumption of the other local network clients 145, 150. For example, the throttling 185 of the background data transfer bandwidth consumption may be based on a percentage of background data transfer bandwidth consumption relative to: the bandwidth consumption over the shared gateway 120 for data transfers of the other local network computing devices 145, 150; the total bandwidth capacity for data transfers over the shared gateway 120; and the actual bandwidth consumption 170 for data transfers over the shared gateway.

In another example embodiment, the local network bandwidth consumption may be determined using the local network interfaces 130 for clients 140, 145, 150, 155, 160 within the local network 125. The local network bandwidth consumption determined may be compared with the bandwidth consumption across gateway 120. Based on the comparison, either the determined local network bandwidth consumption or the actual bandwidth consumption 170 for data transfers over the shared gateway 120, may be used in throttling 185 the amount of background data transfer bandwidth consumption.

Still other embodiments provide that each of the plurality of local network clients 140, 145, 150, 155, 160 include background data transfer modules 135. In this embodiment, bandwidth consumption over the shared gateway 120 is determined for background data transfer for each of the plurality of local network clients 140, 145, 150, 155, 160. Based on the determination, one or more of the background data transfers for the plurality of local network clients 140, 145, 150, 155, 160 is throttled such that the actual amount of bandwidth consumption 170 for the shared gateway device 120 is kept below a predetermined threshold.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system, the computer system including a processor and system memory, the computer system connected to a local network along with one or more other computer systems, the computer systems on the local network sharing a shared gateway situated between the local network and a remote network, the shared gateway providing a link from the local network to the remote network such that communication from the local network to any computer systems on the remote network passes through the shared gateway, the shared gateway having a total bandwidth capacity that the shared gateway can use to transfer data from the local network to the remote network, data transfers through the shared gateway consuming a portion of the total bandwidth capacity such that the available shared bandwidth through the shared gateway is reduced during a data transfer, the available shared bandwidth shared between the computer systems connected to the local network, a method for adaptively adjusting the transfer rate used for background transfer of a file through the shared gateway in response to corresponding changes in available shared bandwidth at the shared gateway so as to use leftover bandwidth, the method comprising acts of:

determining the total bandwidth capacity available at the shared gateway;

initiating background transfer of a file between the computer system and the remote network;

at each interval in a periodic rate, the periodic rate including at least a first interval and a second interval, the second interval separated by a period of time of the periodic rate from the first interval:
  querying the shared gateway for statistics information;
  receiving statistics information on the actual shared bandwidth consumption for data transfers over the shared gateway, the shared bandwidth consumption divided between foreground bandwidth consumption across the shared gateway and background bandwidth consumption across the shared gateway;
  determining an amount of background bandwidth consumed by the background transfer of the file based on the background data transfer rate for the file;
  comparing the total bandwidth capacity and actual shared bandwidth consumption for data transfers over the shared gateway to estimate leftover bandwidth that can be consumed without causing the actual shared bandwidth consumption to exceed a predetermined threshold; and
determining local network bandwidth consumption using local network interfaces for the one or more other computer systems;
comparing the determined local network bandwidth consumption and the actual shared bandwidth consumption across the shared gateway;
based upon the comparison of the total bandwidth capacity and the actual shared bandwidth consumption and upon the comparison of the determined local network bandwidth consumption and the actual shared bandwidth consumption, the processor using the determined local bandwidth or the actual shared bandwidth consumption to adjusting the background data transfer rate for the background transfer of the file to consume the leftover bandwidth while mitigating interference with other data transfers across the shared gateway.

2. The method of claim 1, wherein the method further comprises:
  comparing the total bandwidth consumption across the shared gateway for the computer system along with the total bandwidth capacity and actual bandwidth consumption for data transfers over the shared gateway in order to determine bandwidth consumption over the shared gateway for the one or more other computer systems, and wherein the adjusting the background data transfer rate for the background transfer of the file is further based on the bandwidth consumption of the one or more other computer systems.

3. The method of claim 2, wherein adjusting the background data transfer rate for the background transfer of the file is determined based on a percentage of background data transfer rate for the file relative to: the bandwidth consumption of the one or more other computer systems over the share gateway; the total bandwidth capacity for data transfers over the shared gateway; and the actual shared bandwidth consumption for data transfers over the shared gateway.

4. The method of claim 1, wherein UPnP is used to obtain the statistics information on actual shared bandwidth consumption for data transfers on the shared gateway.

5. The method of claim 1, wherein each computer system connected to the local network includes a background data transfer module, the method further comprising:
  determining at least the background bandwidth consumption over the shared gateway for background data transfer at each of the computer systems; and
  based on the determination, adjusting the background data transfer rate for the background transfer of the files at one or more of the computer systems such that the actual shared amount of bandwidth consumption for the shared gateway is kept below a predetermined threshold.

6. At a computer system, the computer system including a processor and system memory, the computer system connected to a local network along with one or more other computer systems, the computer systems on the local network sharing a shared gateway situated between the local network and a remote network, the shared gateway providing a link from the local network to the remote network such that communication from the local network to any computer systems on the remote network passes through the shared gateway, the shared gateway having a total bandwidth capacity that the shared gateway can use to transfer data from the local network to the remote network, data transfers through the shared gateway consuming a portion of the total bandwidth capacity such that the available shared bandwidth through the shared gateway is reduced during a data transfer, the available shared bandwidth shared between the computer system connected to the local network, a method for adaptively adjusting the transfer rate used background transfer of files through the shared gateway in response to corresponding changes in available shared bandwidth at the shared gateway so as to use leftover bandwidth, the method comprising steps for:
  continuously monitoring the maximum amount of traffic across the shared gateway to determine the total bandwidth capacity available at the shared gateway;
  initiating background transfer of a software update from the remote network to the computer system;
  at a periodic rate, the periodic rate including a plurality of intervals separated from one another by a period of time of the periodic rate, the computer system:
  receiving statistics information on the actual shared bandwidth consumption for data transfers over the shared gateway, the shared bandwidth consumption divided between foreground bandwidth consumption across the shared gateway and background bandwidth consumption across the shared gateway;
  determining an amount of background bandwidth consumed by the background transfer of the software update based on the background data transfer rate for the software update;
  comparing at least the total bandwidth capacity and actual shared bandwidth consumption for data transfers over the shared gateway to estimate leftover bandwidth that can be consumed; and
  determining local network bandwidth consumption using local network interfaces for the one or more other computer systems;
  comparing the determined local network bandwidth consumption and the actual shared bandwidth consumption across the shared gateway;
  based upon the comparison of the total bandwidth capacity and the actual shared bandwidth consumption and upon the comparison of the determined local network bandwidth consumption and the actual shared bandwidth consumption, the processor using the determined local bandwidth or the actual shared bandwidth consumption to adjusting the background data transfer rate for the background transfer of the software update so that portions of the software update are transferred during intervals when actual shared bandwidth consumption is below a predetermined threshold so as to reduce interference with other background data transfers across shared gateway.

7. The method of claim 6, wherein the method further comprises:

comparing the total bandwidth consumption across the shared gateway for the computer system along with the total bandwidth capacity and actual bandwidth consumption for data transfers over the shared gateway in order to determine bandwidth consumption over the shared gateway for the one or more other computer systems, and wherein the adjusting the background data transfer rate for the background transfer of the software update is further based on the bandwidth consumption of the one or more other computer systems.

8. The method of claim 7, wherein adjusting the background data transfer rate for the background transfer of the software update is determined based on a percentage of background data transfer rate for the software update relative to: the bandwidth consumption of the one or more other computer systems over the share gateway; the total bandwidth capacity for data transfers over the shared gateway; and the actual shared bandwidth consumption for data transfers over the shared gateway.

9. The method of claim 6, wherein UPnP is used to obtain the statistics information on actual shared bandwidth consumption for data transfers on the shared gateway.

10. The method of claim 6, wherein each computer system connected to the local network includes a background data transfer module, the method further comprising:
determining at least the background bandwidth consumption over the shared gateway for background data transfer at each of the computer systems; and
based on the determination, adjusting the background data transfer rate for the background transfer of other files at one or more of the computer systems such that the actual shared amount of bandwidth consumption for the shared gateway is kept below a predetermined threshold.

11. A computer program product for use at a computer system, the computer system including a processor and system memory, the computer system connected to a local network along with one or more other computer systems, the computer systems on the local network sharing a shared gateway situated between the local network and a remote network, the shared gateway providing a link from the local network to the remote network such that communication from the local network to any computer systems on the remote network passes through the shared gateway, the shared gateway having a total bandwidth capacity that the shared gateway can use to transfer data from the local network to the remote network, data transfers through the shared gateway consuming a portion of the total bandwidth capacity such that the available shared bandwidth through the shared gateway is reduced during a data transfer, the available shared bandwidth shared between the computer systems connected to the local network, the computer program product for implementing a method for adaptively adjusting the transfer rate used for background transfer of a file through the shared gateway in response to corresponding changes in available shared bandwidth at the shared gateway so as to use leftover bandwidth, the computer program product comprising one or more computer storage media having stored thereon computer executable instructions that, when executed by a processor, cause the computer system to perform the method, including the following:
determine the total bandwidth capacity available at the shared gateway;
initiate background transfer of a file between the computer system and the remote network;
at a periodic rate, the periodic rate including at least a first interval and a second interval, the second interval separated by a period of time of the periodic rate from the first interval:
query the shared gateway for statistics information;
receive statistics information on the actual shared bandwidth consumption for data transfers over the shared gateway, the shared bandwidth consumption divided between foreground bandwidth consumption across the shared gateway and background bandwidth consumption across the shared gateway;
determine an amount of background bandwidth consumed by the background transfer of the file based on the background data transfer rate for the file;
compare at least the total bandwidth capacity and actual shared bandwidth consumption for data transfers over the shared gateway to estimate leftover bandwidth that can be consumed without causing the actual shared bandwidth consumption to exceed a predetermined threshold; and
determine local network bandwidth consumption using local network interfaces for the one or more other computer systems;
compare the determined local network bandwidth consumption and the actual shared bandwidth consumption across the shared gateway;
based upon the comparison of the total bandwidth capacity and the actual shared bandwidth consumption and upon the comparison of the determined local network bandwidth consumption and the actual shared bandwidth consumption, use the determined local bandwidth or the actual shared bandwidth consumption to adjust the background data transfer rate for the background transfer of the file to consume the leftover bandwidth while mitigating interference with other data transfers across the shared gateway.

12. The computer program product of claim 11, wherein the remote network is one of an Internet, Wide Area Network, Virtual Private Network, or an Intranet subdivided into subnets connected via an Internet Gateway Device.

13. The computer program product of claim 11, further comprising computer executable instructions that cause the computer system to perform the following:
compare the total bandwidth consumption across the shared gateway for the computer system along with the total bandwidth capacity and actual bandwidth consumption for data transfers over the shared gateway in order to determine bandwidth consumption over the shared gateway for the one or more other computer systems, and wherein the adjusting the background data transfer rate for the background transfer of the file is further based on the bandwidth consumption of the one or more other computer systems.

14. The computer program product of claim 13, wherein adjusting the background data transfer rate for the background transfer of the file is determined based on a percentage of background data transfer rate for the file relative to: the bandwidth consumption of the one or more other computer systems over the share gateway; the total bandwidth capacity for data transfers over the shared gateway; and the actual shared bandwidth consumption for data transfers over the shared gateway.

15. The computer program product of claim 11, wherein the data transfers include data transfers both in and out of the local network.

16. The computer program product of claim 11, wherein UPnP is used to obtain the statistics information on actual shared bandwidth consumption for data transfers on the shared gateway.

17. The computer program product of claim 11, wherein each computer system connected to the local network includes a background data transfer module, the computer program product further comprising computer executable instructions that cause the distributed computing system to perform the following:

determine at least the background bandwidth consumption over the shared gateway for background data transfer at each of the computer systems; and based on the determination, adjust the background data transfer rate for the background transfer of the files at one or more of the computer systems such that the actual shared amount of bandwidth consumption for the shared gateway is kept below a predetermined threshold.

* * * * *